Nov. 8, 1966   D. H. FIETZ   3,283,566
MATERIAL HARDNESS TESTER
Filed Jan. 29, 1964
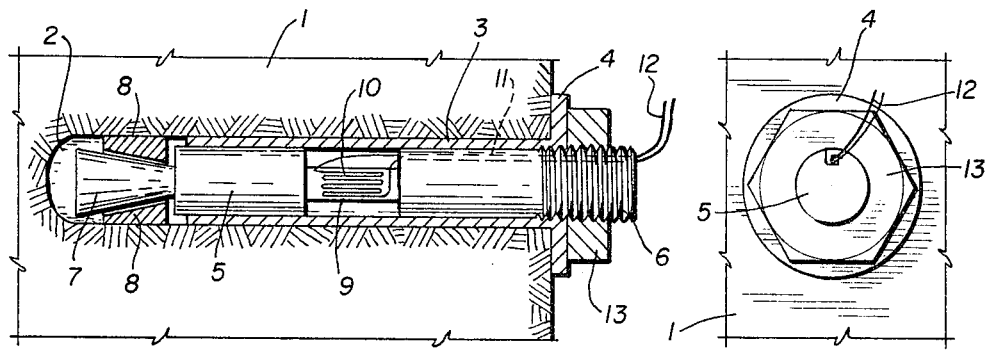
Fig_1   Fig_2
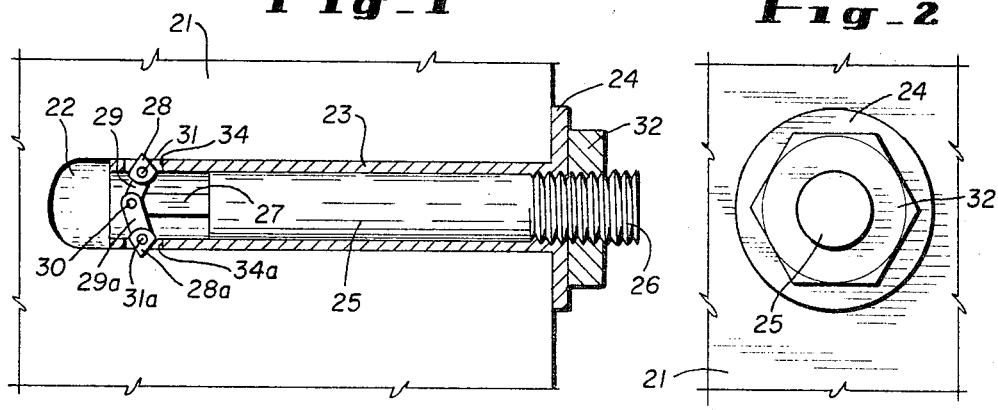
Fig_3   Fig_4
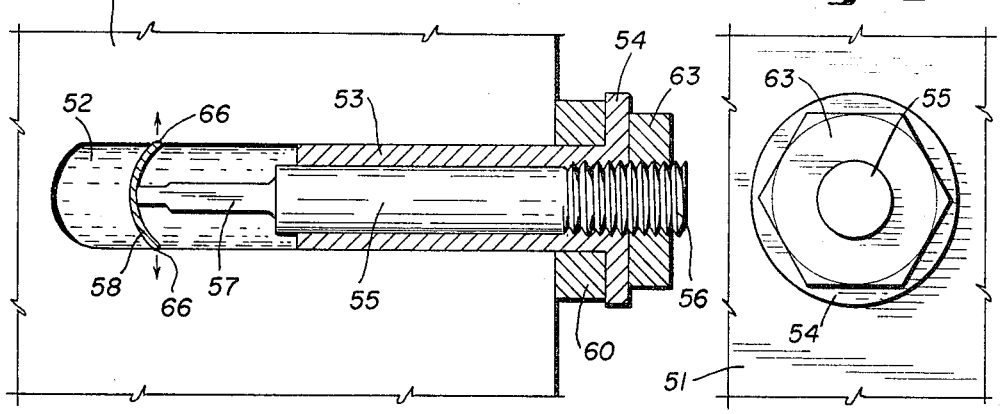
Fig_5   Fig_6
INVENTOR.
Dale Howard Fietz
BY
M Hawley Edwards
ATTORNEYS

United States Patent Office 3,283,566
Patented Nov. 8, 1966

3,283,566
MATERIAL HARDNESS TESTER
Dale H. Fietz, 510 Franklin St., Denver, Colo.
Filed Jan. 29, 1964, Ser. No. 340,934
4 Claims. (Cl. 73—81)

This invention relates generally to material testers and methods for material hardness testing and more particularly to material testers and methods capable of testing the hardness or compressive strength internally of the body of a material.

Available material hardness testers are only capable of surface testing and thus will only reflect hardness inside material by use of large core samples, or otherwise disturbing the body of the material. In many instances it is not possible or is very difficult to take core samples, much less large cores. Present known hardness testers for testing inside a material require not only a probe to penetrate the material but also a device to inspect the indentations inside of a hole after penetration.

An object of this invention is, therefore, to provide a novel tester and methods for testing which will determine the hardnes sor compressive strength below the surface inside the body of materials which requires no additional inspection of indentations made in the material.

Another object of this invention is to provide a novel material hardness tester that will directly measure the hardness at any point inside the body that a hole can be drilled.

Another object of this invention is to provide a novel material hardness tester which simple in construction but accurate in measuring.

Further aims, objects and advantages of this invention will appear from a consideration of the following description and the accompanying drawings showing for purely illustrative purposes embodiments of this invention. It is understood, however, that the description is not to be taken in a limiting sense, the scope of the invention being defined in the appended claims.

Referring to the drawings:

FIG. 1 is a longitudinal sectional view of one embodiment according to this invention;

FIG. 2 is a front end elevation view of the embodiment of FIG. 1;

FIG. 3 is a longitudinal sectional view of another embodiment according to this invention;

FIG. 4 is a front end elevation view of the embodiment of FIG. 3;

FIG. 5 is a longitudinal sectional view of a further embodiment according to this invention; and FIG. 6 is a front end elevation view of the embodiment of FIG. 5.

In FIGS. 1 and 2 there is shown a body of material 1 having a bore hole 2 drilled therein. A cylindrical guide tube 3, having an outer flange portion 4, extends into the bore hole 2. The flange seats on the outer surface of the material around the bore. The guide tube 3 serves to center the device in the bore hole 2. A main support body 5 telescopes into the tube 3. The main support body has threads 6 cut in its outer end extending beyond the bore hole. A double inclined plane or conical portion 7 depends from the inner end of body 5, and is provided with a diminishing diameter toward its inner end for a predetermined length. The portion 7 may be an integral part of body 5 or a separate part attached thereto. A loading head 8 includes a pair of partially conical members mounted in opposed relation over the inclined plane portion 7. The outer surfaces of the head 8 rest against the wall of the bore in the material. The opposed members of the head 8 are moved laterally and compressed into the material by the outward motion of the inclined plane portion 7 of the main body 5. The main support body 5 has a cut-down section 9 of smaller cross-sectional dimensions upon which a strain gauge 10 is secured. The cut-down section increases the strain on material of the gauge body 5. A bonded resistance type strain gauge may be advantageously used. A notch 11 extends from the cut-down section 9 through the main body 5 and contains leads 12 extending from the strain gauge 10 to an external strain detection meter (not shown). A nut 13 is screwed over the threads and rests on flange portion 4. When nut 13 is further rotated this withdraws the main body 5 to compress the loading head 8 into the material. A single resistance gauge may be used, or where necessary for multiplication or compensating extraneous forces, multiple gauges may be secured to the cut-down section.

The complete operation of the embodiment as illustrated in FIGS. 1 and 2 is as follows:

A bore hole 2 is drilled into the material 1 where the measurement is to be made. The device is inserted into the bore hole 2 to a predetermined depth as set by the position of the nut 13 on the threaded portion 6 of the main body 5. The nut 13 is torqued to a value predetermined for each kind of material and a reading is taken from the strain gauge 10. This is established as a reference point from which the measurements will be made. The nut 13 is then turned a specified number of rotations and the strain is again measured. The additional strain may then be calibrated to actual hardness of the material from information obtained under control conditions. For each kind of material being tested, a different set of loading heads 8 and a different set of calibration curves are required.

In FIGS. 3 and 4 there is shown another embodiment of a hardness gauge mounted in a bore hole 22 drilled in the material 21 to be tested. A guide tube 23, having an outer flange 24, extends into the bore hole 22. A main support body 25 terminates at its outer and in threads 26 and at its inner end in a portion 27 of decreased diameter. A toggle head is mounted on portion 27 and it includes force links 29, 29a pivotally mounted on a central pivot 30 extending at an angle toward the wall of the bore 25. Loading heads 28, 28a are pivotally mounted on pins 31, 31a on the force links 29, 29a, respectively. Loading heads 28, 28a have small, sharp points which extend through openings 34, 34a, respectively, in the guide tube 23. A nut 32 is screwed over the threads and is arranged to straighten the force links, forcing loading heads 29, 29a into the material inside the bore hole.

The general operation of the embodiment in FIGS. 3 and 4 is similar to that shown in FIGS. 1 and 2 with loading heads 28, 28a being forced into the material through the movement of support body 25 and force links 29, 29a. A torque wrench (not shown) is used to rotate nut 32 and thereby advance main body 25 out of the bore hole. A torque reading is taken at a predetermined reference point and then again after the nut 32 has been turned a preselected number of turns, thus giving an indication of the force exerted on the support body 25 in forcing the loading heads 29, 29a into the material.

It has been found in actual tests that the force required to impress the loading heads 28, 28a into the material is a function of the loading head area and the compressive strength of the material tested. This is true for loading head areas of approximately .10 to 1.0 square inches in materials of approximately 5000 pounds per square inch compressive strength or less. It has been found that for loading heads with approximately .10 to almost 0 square inch areas measurements can be taken in materials with approximately 5000 pounds per square inch and higher. This latter range can be particularly handled by the loading head construction of the embodiment of FIGS. 3 and 4 above described. Although the operation of FIG. 3 has been described using a torque reading for measuring hardness, it is clear that a strain gauge may be attached to main body 25 and used in the manner described in FIG. 1.

In FIGS. 5 and 6 there is shown a further embodiment which is similar to that shown in FIGS. 3 and 4 and in which a guide tube 53, which an outer flange 54, is telescoped into bore hole 52 in material 51. A spacer 60, for adjusting the depth of the loading heads, fits between the outer flange 54 and the surface around the bore of the material 51. The spacer 60 illustrates one means of adjusting the position of the loading head in the bore hole and can also be used for this purpose in the embodiments of FIGS. 1 and 2 and FIGS. 3 and 4. A main support body 55 has threads 56 at its outer end outside the bore hole and a portion 57 on its inner end of smaller cross-sectional area. A flexible loading head 58 is attached to the lower end portion 57. The head 58 may be circular or a fragment is a circle. Loading head 58 being flexible has its contacting edge 66 expandable on application of withdrawal of the body 55. A nut 63 screws over threads 56 to withdraw main body 55 and force loading head 58 into the material. The general operation of the embodiment shown in FIGS. 5 and 6 is similar to that in FIGS. 3 and 4 above described. It may also be used with a strain gauge as described for the device of FIGS. 1 and 2.

It is noted that the above described invention is not limited to horizontally drilled holes but can be used at any angle at which a bore hole can be drilled. Various types of material are suitable for the various parts such as glass, ceramic, wood, metal, plastic or the like. In addition there may be variation of the angle of inclination, dimension, size, shape and finish.

Although the invention has been described with a certain degree of particularity, it is understood that the present disclosure has been made only by way of example and that numerous changes in details of construction and combination and arrangement of parts may be resorted to without departing from the spirit and score of the invention as hereinafter claimed.

I claim:

1. A testing device for use in determining the hardness of a material internally of the material using a small bore hole therein comprising a guide tube having flange means adjacent one end arranged to seat on the outer surface of the material and limit penetration of said guide tube in a bore hole; a support body reciprocably telescoped in said guide tube and terminating adjacent said flange in a portion extending beyond said flange on the side opposite said guide tube; laterally extendable penetrating means movable outward from said guide tube in opposed relation therefrom for contacting the wall of bore in the material; motion translating means depending from said support body and connected with said laterally extendable penetrating means for moving said penetrating means into the wall of the material on outward movement of the support body; means mounted on the outer end of said support body for drawing said support body outwardly toward the bore opening to exert an initial force on said motion translating means to form an initial indentation by each said penetrating means; said means arranged for increasing the force exerted on said motion translating means to form a final indentation by each said penetrating means; first detecting means for measuring the outward movement of said support body from said initial indentation position to said final indentation position and second detecting means for measuring the difference between said initial and final forces.

2. A device for use in determining the hardness of material inside the body of the material using a bore hole therein comprising guide means extending into the bore hole in contact with the material, a support body nesting within the housing terminating at its outer end in a threaded portion and terminating at its inner end in an inclined plane portion, the central portion of the body having a cut-down section, a loading head having partial conical members, the partial conical members mounted on the inclined plane portion of the support body, a nut secured over the threads and having one surface resting on the flange so that upon rotation of said nut drawing said central body toward the outlet of said bore so that the partial conical members are forced laterally into the material in the bore hole, and detecting means attached to the cut-down portion of the body to measure the stress exerted on the support body in forcing the conical members into the material.

3. A device for determining hardness of material inside the body of the material using a bore hole having on outlet therein comprising a guide tube extending into the bore hole, said guide tube having an outer flange seated on the outer surface of the material, a support body telescoping within the guide tube terminating at its outer end in a threaded portion and terminating at its inner end in a portion of decreased diameter, a toggle head pivotally attached to the inner end portion, said toggle head having at least one force link extending at an angle toward the material wall of the bore hole and a head means having at least one sharp edge in contact with the material wall attached to said force link, a nut secured over the threads and having one surface thereof resting on said outer flange so that upon rotation of the nut said toggle head is moved toward the outlet and said force link is extended laterally toward the wall of the bore thereby forcing the sharp edge into the material wall, and means for measuring the force exerted on the body in advancing the head means into the material wall.

4. A device for determining hardness of a material inside the body of the material using a bore hole therein comprising guide means extending into the bore hole, said guide means having an upper flange seated on the outer surface of the material with a spacer between the flange and the material, a support body telescoping in the guide means having in outer end with a threaded portion, flexible means having normal extended peripheral dimensions greater than the diameter of said bore so that it is bent on entering said bore with its peripheral portions extended toward the bore opening and having points at the extremities thereof attached to the inner end of the support body, a nut secured over the threads having one surface thereof resting on the spacer so that upon rotation of the nut said support body is drawn toward the bore opening and the points of the flexible means are forced into the material, and measuring means for measuring the force exerted on the support body in advancing the points into the material.

References Cited by the Examiner

UNITED STATES PATENTS

| 2,600,029 | 6/1952 | Stone | 85—62 X |
| 2,898,761 | 8/1959 | Hast | 73—88.5 X |
| 2,943,528 | 7/1960 | Curry | 85—62 |
| 3,133,468 | 5/1964 | Cumming | 85—62 |
| 3,161,174 | 12/1964 | Harrison | 85—62 X |

FOREIGN PATENTS

| 983,514 | 2/1951 | France. |
| 704,290 | 2/1954 | Great Britain. |

RICHARD C. QUEISSER, *Primary Examiner.*

EDWARD D. GILHOOLY, *Assistant Examiner.*